US007016878B2

(12) United States Patent
Yoshioka et al.

(10) Patent No.: US 7,016,878 B2
(45) Date of Patent: Mar. 21, 2006

(54) CONTENT SALES PERIOD VERIFYING SYSTEM AND CONTENT DECRYPTION KEY EFFECTIVE PERIOD VERIFYING SYSTEM

(75) Inventors: Makoto Yoshioka, Kanagawa (JP); Haruhiko Tsunoda, Kanagawa (JP); Kazuharu Hasegawa, Kanagawa (JP); Hidefumi Aoe, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 08/645,073

(22) Filed: May 13, 1996

(65) Prior Publication Data

US 2005/0071272 A1   Mar. 31, 2005

(30) Foreign Application Priority Data

Sep. 20, 1995   (JP) ................................. 7-242125

(51) Int. Cl.
*G06F 17/60* (2006.01)
(52) U.S. Cl. .......................................... 705/51; 705/52
(58) Field of Classification Search .................... 380/4, 380/9, 23, 25, 21, 40, 50, 59, 24, 203; 705/52, 705/1, 7, 11, 51; 713/189–191, 193, 200–202; 755/6.1; 348/12
See application file for complete search history.

(56) References Cited

U.S. PATENT DOCUMENTS

| | | | | |
|---|---|---|---|---|
| 4,450,535 A | * | 5/1984 | De Pommery et al. ...... 364/900 |
| 4,740,890 A | * | 4/1988 | William ..................... 380/4 X |
| 4,924,378 A | * | 5/1990 | Hershey et al. ............. 380/4 X |
| 5,014,234 A | * | 5/1991 | Edwards, Jr. .............. 380/4 X |
| 5,023,907 A | * | 6/1991 | Johnson et al. ................. 380/4 |
| 5,142,690 A | * | 8/1992 | McMullan, Jr. et al. ..... 455/6.1 |
| 5,163,356 A | * | 11/1992 | Chigira ........................ 99/282 |
| 5,175,716 A | * | 12/1992 | Min ........................ 369/44.11 |
| 5,255,086 A | * | 10/1993 | McMullan, Jr. et al. ...... 348/12 |
| 5,343,524 A | * | 8/1994 | Mu et al. ........................ 380/4 |
| 5,564,038 A | * | 10/1996 | Grantz et al. ............... 380/4 X |
| 5,579,479 A | * | 11/1996 | Plum ......................... 380/4 X |
| 5,613,109 A | * | 3/1997 | Yamauchi et al. .......... 395/615 |
| 5,715,314 A | * | 2/1998 | Payne et al. .................. 380/24 |

FOREIGN PATENT DOCUMENTS

JP    406081525 A  *  3/1994

OTHER PUBLICATIONS

IBM Technical Disclosure Bulletin; Title:Technique for initiating a conference call from a calendar database, Feb. 1, 1991, TDB-ACC-NO: NN910258.*

* cited by examiner

*Primary Examiner*—Elisca Pierre Eddy
(74) *Attorney, Agent, or Firm*—Staas & Halsey LLP (57) ABSTRACT

A CD-ROM is recorded with a CD-ROM effective period and an effective period of a content stored in the CD-ROM. A CD-ROM effective period judging section of a personal computer reads the effective periods, compares these periods with a machine date generated by a machine date generating section and enables a purchase slip transmitting section to transmit a purchase slip only when the machine data falls within the effective periods. A CD-ROM effective period judging section of a center compares the present date with the CD-ROM effective period and the content effective period registered on a goods master, reads the key from the goods master and transmits the key to the personal computer only when both of a CD-ROM number and a content ID written onto the received purchase slip fall within the effective periods.

24 Claims, 4 Drawing Sheets

CONTENT SALES PERIOD VERIFYING SYSTEM AND CONTENT DECRYPTION KEY EFFECTIVE PERIOD VERIFYING SYSTEM

BACKGROUND OF THE INVENTION

1. Field of the Invention

The present invention relates to a content sales period verifying system and a content decryption key effective period verifying system in a content sales system for selling contents on line.

2. Description of the Related Art

With a widespread use of CD-ROM drives, a content such as a film, musical work, computer program, database, etc., in the form of software and defined as digital data is frequently distributed through a CD-ROM medium. The CD-ROM medium can be manufactured at low costs and has a large capacity exceeding 500 MB. In addition, CD-ROM drives are decreasing in price and increasing in speed. Further, the CD-ROM is comparatively lightweight and thin for its storage capacity and, therefore, can be distributed by various methods, including being interposed in a magazine for distribution or other uses.

The content of the CD-ROM is stored as digital data, therefore the content can be illegally copied and installed (the term "install" herein connotes an introduction of the content into a disk device of a personal computer). Accordingly, when distributing the content of the CD-ROM, illegal copying and installation must be prevented.

Accordingly, the following has hitherto been practiced to date. In distributing the content by CD-ROM, several types of trial version contents and an encrypted real content are recorded on the CD-ROM, and thus distributed. Only a user paying a using charge (which is a one-time payment) for the content is supplied with a key for decrypting the encrypted real content, permitting the user to use the real content. For the purpose of explanation, the phrase "supplying the key in exchange of the payment of the using charge for the content" is expressed such as "selling the content".

By the way, in the traditional over-the-counter selling of the contents, there must be several cases where the contents are sold with a predetermined limit of a sales period as in the case of weekly and monthly magazines or seasoning goods, where the sales of unpopular contents are discontinued, and where the sales of old versions are terminated due to a version-up of the computer program. It is therefore desired that the content sales system should meet those cases even when selling the contents in the form of the digital data. Namely, it is desirable to construct a novel content sales system capable of previously setting a sales period for which the contents can be sold and newly setting or shortening a sales period depending on circumstances after a start of sales.

The conventional content sale system employing the CD-ROM is, however, not able to meet the cases described herein above.

SUMMARY OF THE INVENTION

A primary object of the present invention, which was contrived to respond the above requests, is to provide a content sales period verifying system and a content decryption key effective period verifying system that are capable of restricting a content sales period in a content distribution system for selling contents on line.

To overcome the above-mentioned problems, the present invention adopts the following constructions.

A content sales period verifying system according to the present invention is a system in a content distribution system in which a center sells a content in response to a request for purchasing the content given from a terminal. The terminal may comprise a sales period reading section for reading a sales period set on the content, a present time data generating section for generating present time data indicating present time, a comparing section for comparing the sales period read by the sales period reading section with the present time indicated by the present time data generated by the present time data generating section, and a purchase requesting section for requesting the center for purchasing the content when the comparing section judges that the present time falls within the sales period.

According to the content sales period verifying system of the present invention, the sales period reading section reads the sales period set on the content. The present time data generating section generates the present time data indicating the present time. The comparing section compares those sales periods with the present time indicated by the present time data. Then, the purchase requesting section requests the center for purchasing the content. Accordingly, the terminal never requests the center for purchasing the content of which sales period has elapsed.

Herein, the content is defined as software including a program, musical data and video data of a movie, etc. The content may be provided both in an analog form and in a digital form.

The content may be supplied to a user from the center in response to the purchase request or may be supplied to the user in a previously encrypted status. In the latter case, the center supplies the key for decrypting the encrypted content to the user in response to the purchase request from the user. In the content distribution system in the latter case, a single piece of medium stores a plurality of encrypted contents, each set with the sales periods thereof. Then, the terminal making the request for purchasing one of those contents is supplied with the key for decrypting this content. Based on such a construction, a great quantity of contents can be sold through simple communications between the terminals and the center. In this case, the effective period of the medium itself may be set on the medium storing the content. Herein, the terminal may further comprise an effective period reading section for reading the effective period of the medium itself. Then, the comparing section compares the effective period of the medium itself that is read by the effective period reading section with the present time indicated by the present time data generated by the present time data generating section. The purchase requesting section requests the center for the purchase when the comparing section judges that the present time falls within the sales period and is anterior to end of the effective period of the medium itself. With this construction, the period for which the center must deal with the medium is automatically confined, and hence the operations in the center can be simplified.

The center may comprise a database registered with the sales period set on each content, a database reading section for reading the sales period of the content from the database when the terminal makes the request for purchasing one of the contents, a determining section for determining whether the present time falls within the sales period read by the database reading section, and a key supplying section for supplying the terminal with a key for decrypting the content when the determining section determines that the preset time falls within the sales period. With this construction, even if the present time data generating section of the terminal does not generate the precise present time data, the center is capable of checking the sales period of the content requested for purchasing and rejecting the sales of the content of which sales period has elapsed.

Further, the center may comprise a database registered with the effective period of the medium itself and the sales period set on each content, a database reading means for reading the effective period of the medium itself and the content sales period from the database, a determining section for determining whether the present time is anterior to end of the effective period read by the database reading section, and whether the present time falls within the sales period read by the database reading section, and a key supplying section for supplying the terminal with a key for decrypting the content when the determining section determines that the present time is anterior to the end of the effective period and falls within the sales period. With this construction, even if the present time data generating section of the terminal does not generate the precise present time data, the center is capable of checking the sales period of the content requested for the purchasing and the effective period of the medium and also rejecting the sales of the content of which sales period or the effective period of the medium itself has elapsed.

The center may further comprise a period data adding section for generating period data indicating an effective period of the key and adding this item of period data to the key supplied to the terminal by the key supplying section. In this case, the terminal may further comprise a second comparing section for comparing the key effective period indicated by the period data with the present time indicated by the present time data generated by the present time data generating section, and a decrypting section for decrypting the content requested for the purchasing when the second comparing section judges that the present time falls within the key effective period. If constructed in this way, the period data adding section of the center is capable of setting the key effective period regardless of the content sales period and the medium effective period. Accordingly, even on the verge of a termination of the content sales period, or when the purchase request is made on the verge of a termination of the medium effective period, the effective period can be set so that the content can be decrypted with an allowance.

In this case, the terminal may further comprise a disk device for storing the contents, and an installing section for installing the content decrypted by the decrypting section into the disk device.

On the other hand, a content decryption key effective period verifying system may be a system in a content distribution system for distributing encrypted contents and supplying terminals making requests for purchasing a content with key for decrypting the content. A center may comprise a period data adding section for generating period data indicating a key effective period and adding the period data to the key. The terminal may comprise a present time data generating section for generating present time data indicating a present time, a comparing section for comparing the key effective period indicated by the period data with the present time indicated by the present time data generated by the present time data generating section, and a decrypting section for decrypting the content requested for the purchasing when the comparing section judges that the present time falls within the key effective period.

According to the content decryption key effective period verifying system of the present invention, the period data adding section of the center generates the period data indicating the effective period of the key and adds this item of period data to the key. On the other hand, the present time data generating section of the terminal generates the present time data indicating the present time. Then, in response to the sending of the period data, the comparing section compares the key effective period indicated by the period data with the present time indicated by the present time data generated by the present time data generating section. The decrypting section decrypts the encrypted content requested for purchasing when the comparing section judges that the present time falls within the key effective period.

These together with other objects and advantages which will be subsequently apparent, reside in the details of construction and operation as more fully hereinafter described and claimed, reference being had to accompanying drawings forming a part hereof, wherein like numerals refer to like parts throughout.

BRIEF DESCRIPTION OF THE DRAWINGS

The present invention will become more fully understood from the detailed description given hereinbelow and the accompanying drawings, in which.

DESCRIPTION OF THE PREFERRED EMBODIMENT

A preferred embodiment of the present invention is discussed herein below with reference to the accompanying drawings.

<Outline of Content Distribution System>

Figure 1:
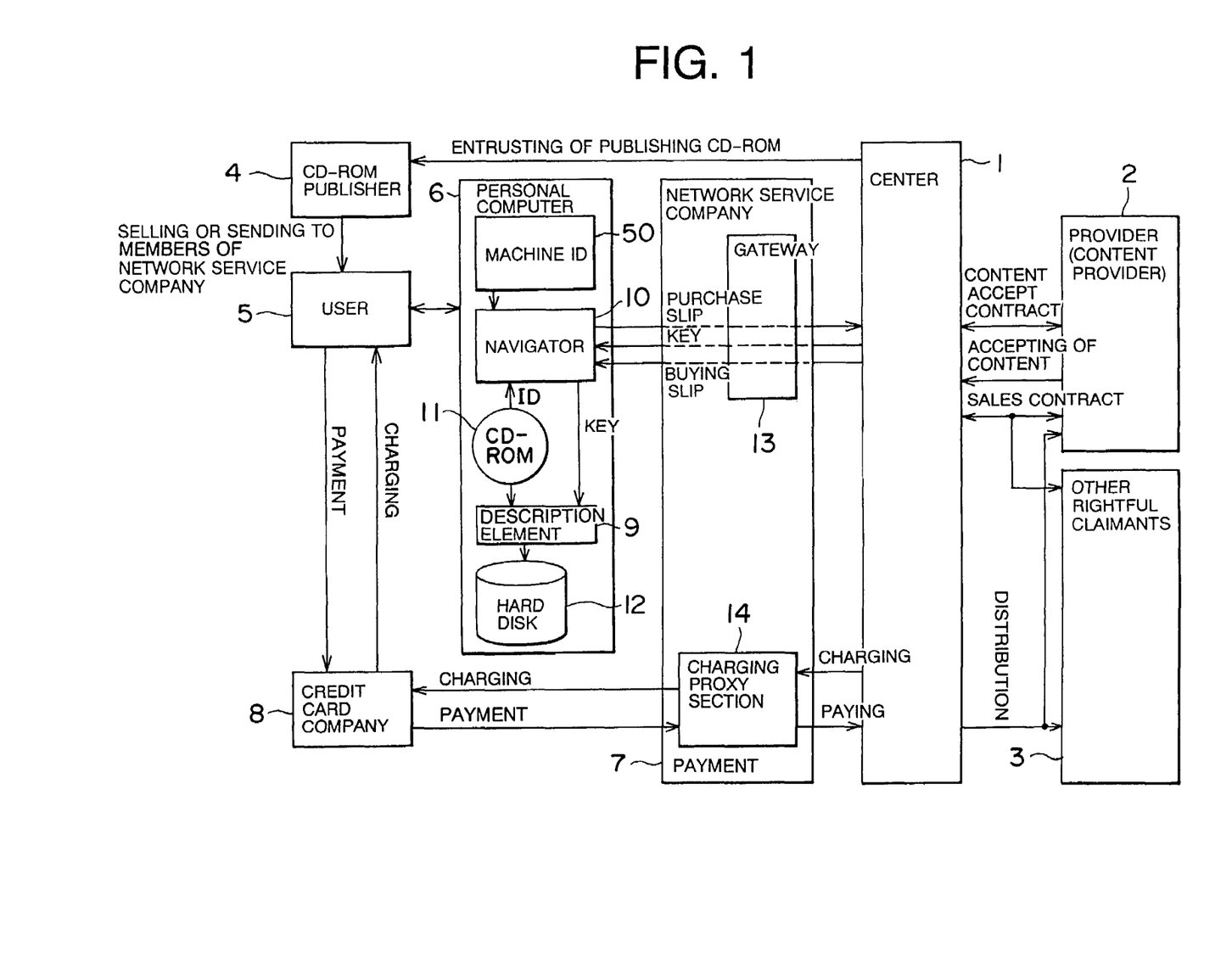
FIG. 1 is a schematic diagram showing a content distribution system in an embodiment of the present invention.

FIG. 1 is a block diagram illustrating an outline of a content distribution system in which the present invention is embodied. Referring to FIG. 1, an SD center 1 is equipment serving as a center of the content distribution system. An operator operating the SD center 1 may be also an enterpriser or entrepreneur of a content distribution enterprise utilizing this content distribution system. The operator in the SD center 1 enters into a content accept contract with a provider 2 for a variety of contents. The SD center 1 accepts the contents from the provider 2 on the basis of this content accept contract. Then, the operator operating the SD center 1 enters into a sales contract with respect to contents determined for sales among those accepted and distributes part of proceeds of the sold contents to the providers 2. Further, as need be, the operator of the SD center 1 enters into sales contracts with rightful claimants 3 other than the providers 2 and distributes part of the proceeds in accordance with that sales contract.

The SD center 1 encrypts a plurality of contents with the sales contracts established and creates trial version contents with omissions of some functions thereof. Then, the encrypted contents and the trial version contents are recorded on a single original CD-ROM (medium). Written to each contents recorded on the original CD-ROM is a sales allowable period (which is a content effective period, i.e., the sales period set in the content) prescribed based on the contract with the provider 2. Recorded also on the original CD-ROM during this editing session are a navigator (which is a software program) executing a series of processes for decrypting the encrypted contents and an installer (which is also a software program) for this navigator. Written further to this original CD-ROM is a CD-ROM effective period (which is an effective period of the medium itself) for limiting the sales allowable period common to all the contents that is recorded on this original CD-ROM. the operator of the SD center 1, after performing such editing, requests a CD-ROM publisher 4 to publish this CD-ROM.

The SD center 1 is connected via a gateway 13 to a network service company 7. The SD center 1 is connected via the network service company 7 and a public telephone network (which is not shown) to a personal computer 6 belonging to a user 5. The SD center 1 transmits, to the personal computer 6 of the user 5 via the network service company 7, a buying slit and a content key for decrypting the content indicated on a purchase slit, in response to the purchase slit transmitted via the network service company 7 from the personal computer 6. Also, the SD center 1 issues a demand for payment of the prices of the content sold as described herein above to a charging proxy section 14 of the network service company 7 and collects the money therefrom.

The provider 2 is normally a copyright owner (such as the author) of the content. More specifically, the provider 2 may be a sole copyright owner or a sole creator of a certain content (a so-called primary authored work, secondary authored work, authored film work and authored editing work), all of co-copyright owners or co-creators of a certain content, and all of copyright owners or creators of respective constructive elements of an aggregative authored work. Those are direct copyright owners or creators (so-called modern authors) of the relevant contents. Unless the sales contracts with those copyright owners or creators are entered into, the SD center 1 is not allowed to sell the relevant contents. Each provider 2 has an unique ID (authoring ID).

Other rightful claimants 3 are third parties other than the providers 2 who have a right of directly charging the SD center 1 if the relevant contents are to be copied or who have an obligatory right (right of charge for running royalty, etc.) against the provider 2 if the contents are copied. A specific example of the former case are copyright owners or creators (so-called classical authors) of original authored works with respect to the secondary (or derivative) authored works and the film authored works, copyright owners or creators of authored works applied to the film authored works, performers of musical authored works and copyright owners or creators of respective constructive elements in the editing authored works. The SD center 1 is prohibited from copying the relevant contents without approval of those copyright owners and therefore must enter into sales contracts with those authors.

Another specific example of the latter case is creators who are not copyright owners but are persons entered into a running royalty payment contract with a copyright owner (provider 2 or copyright owner as applied to the former case) when transferring a right of the work. Each of those other rightful claimants 3 has an unique ID.

The network service company 7 represents an enterpriser or entrepreneur providing network data communications such as personal computer communications but also represents a host computer thereof. The network service company 7 is, in response to a connection request received from a personal computer 6, connected via the public telephone network (which is not shown in FIG. 2) to this personal computer 6 of the user 5 registered with a membership as well as being connected to the SD center 1. Then, the network service company 7 implements a variety of data switching services between the respective personal computers 6 connected thereto and the SD center 1. The user 5 must register his or her own valid credit card number in the network service company 7 by way of a debit of service charge as a prerequisite for the registration of the membership of the network service company 7.

Further, the charging proxy section 14 of the network service company 7, in response to a charge of the content price from the SD center 1, adds an amount of money of this charge to the service using charge of the membership user 5 defined as a content purchaser. Then, the charging proxy section 14 charges a credit card company 8 offering the credit card number being registered in the network service company 7, for the service using charge to which the content price is added. When the credit card company 8 pays the service using charge in response to the above-mentioned charge, the network service company 7 deducts the primary service using charge and a predetermined fee and pays the remainder to the SD center 1.

The credit card company 8 debits the service using charge charged by the charging proxy section 14 from the user 5 (more specifically, from an account, such as a bank account, of the user 5).

The CD-ROM publisher 4 receives an entrustment for publishing the CD-ROMs form the SD center 1 and mass-produces the original CD-ROM transferred from the SD center 1. The CD-ROM publisher 4 sells the thus copied CD-ROMs 1 to the users 5 or sends the CD-ROMs to the users 5 as registered memberships of the network service company 7 free of charge.

The user 5 loads the CD-ROM 11 obtained from the CD-ROM publisher 4 into his or her own personal computer 6. Then, the user 5 executes an installer program stored in the CD-ROM 11. The installer program installs a navigator 10 onto a hard disk 12 of the personal computer 6 and generates a machine ID 50 by forming of random numbers, etc. The installer program then writes this machine ID to the hard disk 12 of the personal computer 6. The installer program does not generate a new machine ID 50 if the machine ID 50 has already been generated in this hard disk 12.

When the navigator 10 is executed within the personal computer 6, the navigator 10 generates a content decryption element 9. Then, the navigator 10, in accordance with a command input by the user 5, enables the user 5 to try out a trial version content within the CD-ROM 1, indicates a list of real contents within the CD-ROM 11 and accepts a request for purchasing a specific content from the user 5. The navigator 10, upon accepting the purchase request from the user 5, creates a purchase slip (text data) for purchasing the content that the user 5 requests to purchase. Also, the navigator 10 is connected to the network service company 7 by executing a communication program (see FIG. 2) and is further connected to the SD center 1 via the gateway 13 to transmit the created purchase slip to the SD center 1. Written into this purchase slip are a CD-ROM number (which is unique to every CD-ROM), a content ID (which is unique to every content), an access number generated from the CD-ROM number, the content ID and the machine ID, and an ID (hereinafter referred to as user ID) of the relevant user 5 that is registered in the network service company 7. When the SD center 1 transmits an encrypted content key (for demodulating the encrypted content) in response to the sending of the purchase slip, the navigator 10 decrypts the content key with the machine ID and transfers the decrypted key to the content decryption element 9. The content decryption element (corresponding to a decrypting section and an installing section) 9 reads the (encrypted) content that the user 5 requested to purchase out the CD-ROM 11 and decrypts the content with the content key and installs the decrypted content into the hard disk (which is a disk device) 12.

<Specific Constructions of Personal Computer 6 and SD Center 1>

Figure 2:
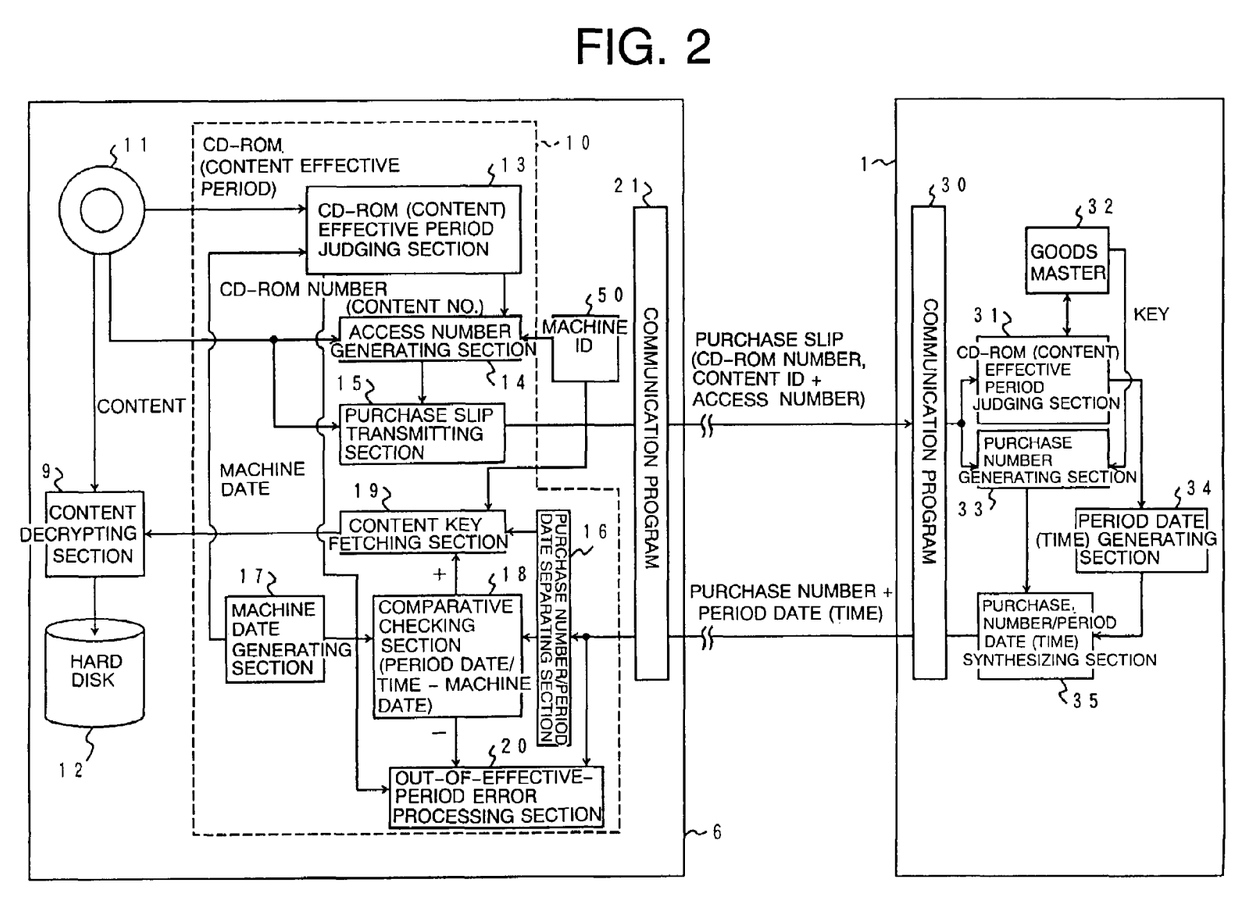
FIG. 2 is a block diagram illustrating a detailed configuration of a personal computer 6 and an SD center 1 shown in FIG. 1.

A construction of the personal computer 6, especially the navigator 10 is explained in detail with reference to FIG. 2. FIG. 2 illustrates only the personal computer 6 and the SD center 1 with an omission of illustration of the network service company 7 intervening therebetween.

As shown in FIG. 2, the navigator 10 comprises a CD-ROM (and contents) effective period determining section 13, an access number generating section 14, a purchase slip transmitting section 15, a purchase number/period date separating section 16, a machine data generating section 17, a comparative checking section 18, a content key fetching section 19 and an out-of-effective-period error processing section 20.

A CD-ROM effective period of the CD-ROM 11 loaded in the personal computer 6 is read by the CD-ROM effective period determining section 13 serving as an effective period reading section. Further, a CD-ROM number of this CD-ROM 11 is read by the access number generating section 14 and the purchase slip transmitting section 15 as well. On the other hand, the CD-ROM effective period determining section 13 serving as a sale period reading section reads a content effective period of a content that the user requested to purchase among a plurality of contents stored in the CD-ROM 11. A content ID is read by the access number generating section 14 and the purchase slip transmitting section 15, and the content itself is read by the content decryption element 9.

On the other hand, the machine date generating section (serving as a present time data generating section) 17 generates a machine date (which is an item of present time data indicating a present time) indicating a present date, month and year and inputs the machine date to the comparative checking section 18 and the CD-ROM effective period determining section 13.

The CD-ROM effective period determining section 13 serving as a comparing section compares the machine date with the CD-ROM effective period and the content effective period and checks whether the machine date exceeds the CD-ROM effective period or the content effective period. Then, as far as the machine date exceeds neither the CD-ROM effective period nor the content effective period, the CD-ROM effective period determining section 13 actuates the access number generating section 14. If the machine date exceeds the CD-ROM effective period or the content effective period, the out-of-effective-period error processing section 20 is notified of an out-of-effective-period message.

The thus actuated access number generating section (corresponding to a purchase requesting section) 14 generates an access number by carrying out predetermined arithmetic operations for the CD-ROM number and the content ID that have been read from the CD-ROM 11 and the machine ID. The access number generating section 14 notifies the purchase slip transmitting section 15 of the thus generated access number.

The purchase slip transmitting section 15 creates a purchase slip in a text date format. Written onto this purchase slip are the access number generated by the access number generating section 14, and the CD-ROM number and the content ID that have been read from the CD-ROM 11. The purchase slip transmitting section 15 transmits the purchase slip written with necessary items to the SD center 1 by executing a communication program 21.

The SD center 1 receives this purchase slip by executing a communication program 30 and inputs the purchase slip to a CD-ROM effective period determining section 31 and a purchase number generating section 33.

The CD-ROM effective period determining section 31 serving as a database reading section refers to a goods master 32 serving as a database on the basis of the CD-ROM number and the content ID that have been written onto the purchase slip. This goods master 32 is a database recorded with a CD-ROM number and a CD-ROM effective period (which is an effective period of the medium itself) of the CD-ROM 11, and a content ID, a sales price, a content effective period (which is a sales period set in the content) and a content key used for decryption of each content that have been written to the CD-ROM 11, for every CD-ROM 11. Note that the CD-ROM effective period and the content effective period stored in the goods master 32 may be changed (reduced) in consideration of a sales quantity of corresponding content even after starting the sales of the content.

The CD-ROM effective period determining section 31 serving as a judging section, as a result of referring to the goods master 32, reads the CD-ROM effective period corresponding to the CD-ROM number and the content effective period corresponding to the content ID. Subsequently, the CD-ROM effective period determining section 31 compares the read CD-ROM effective period corresponding to the CD-ROM number and the content effective period corresponding to the content ID with the present date. The CD-ROM effective period determining section 31 then checks whether the present date exceeds the CD-ROM effective period or the content effective period. Herein, the reason why the CD-ROM effective period determining section 31 of the SD center 1 checks the same effective period as in the CD-ROM effective period determining section 13 of the personal computer 6 lies in easiness of changing the machine date set in the personal computer 6. To be specific, if the user 5 changes machine date back to a date anterior to the effective period even after an elapse of the actual CD-ROM or content effective period, the purchase slip could be illegally created. Since the SD center 1 can not prevent such an illegal creation of the purchase slip, there must be taken a counter measure of rechecking the effective period on the basis of the sent purchase slip. The CD-ROM effective period determining section 31 actuates a period date (time) generating section 34 if the present date exceeds neither the CD-ROM effective period nor the content effective period.

On the other hand, the purchase number generating section 33 performs a predetermined arithmetic operation (which is backward reckoning of the operation for generating the access number) for the access number written onto the purchase slip, thereby restoring the machine ID unique to the personal computer 6. Further, the purchase number generating section 33 reads a content key corresponding to the CD-ROM number and the content ID written onto the purchase slip from the goods master 32. Then, the purchase number generating section 33 encrypts the content key with the machine ID and calculates a "purchase number" as a result of the encryption. The purchase number generating section 33 notifies a purchase number/period date (time) synthesizing section 35 of this "purchase number".

The above-mentioned/period date (time) generating section (corresponding to a period data adding section) 34 generates a "period date and time (period data)" indicating an effective period of the "purchase number". Then, the period date (time) generating section 34 actuates the purchase number/period date (time) synthesizing section 35 and notifies the same section 35 of the "period date and time". Note that the "period date and time" coincides in principle with the CD-ROM effective period or the content effective period. If the present date and time are immediately before the CD-ROM effective period or the content effective period, a date and time after an elapse of a predetermined period since the present date is set as the "period date and time" In such a case, even when the purchase number is generated anterior to the effective period, it may happen that a content decryption and an installation of the content are executed based on the purchase number after the effective period due to a time-consuming operation of the personal computer 6 and some other reasons. Therefore, the "period date and time" is set with some allowance to prevent the content description and the installation from being impossible of execution in the case described herein above.

The purchase number/period date (time) synthesizing section (corresponding to a key supplying section) 35 synthesizes the "period date and time" and the purchase number notified from the purchase number generating section 33 only when actuated by the period date (time generating section 34. Then, the combination of the thus synthesized purchase number and "period date and time" are sent back to the personal computer 6 through the communication program 30. Further, the purchase number/period date (time) synthesizing section 35, if the present date is posterior to the elapse of the CD-ROM effective period or the content effective period, sends an error message indicating the posteriority to the elapse of the effective period back to the personal computer 6.

Returning to the personal computer 6, the combination of the purchase number and the "period date and time" received through the communication program 21 are inputted to the purchase number/period date separating section 16, while the error message is inputted to the out-of-effective-period error processing section 20.

The purchase number/period date separating section 16 separates the received combination of the purchase number and the "period date and time" into the purchase number and the "period date and time", respectively. Then, the purchase number/period date separating section 16 inputs the purchase number to the content key fetching section 19 and the "period date and time" to the comparative checking section 18.

The comparative checking section (corresponding to a second comparing section) 18 compares the "period date and time" receives from the purchase number/period date separating section 16 with a machine date inputted from the machine date generating section 17 and checks whether the machine date exceeds the "period date and time". Then, if the machine date has already exceeded the "period date and time", the out-of-effective-period error processing section 20 is notified of an out-of-effective-period message. Whereas if the machine date does not yet exceed the "period and time", the content key fetching section 19 is actuated.

When notified of the out-of-effective-period message from the CD-ROM effective period determining section 13 or the comparative checking section 18, and when receiving an error message directly through the communication program 21, the out-of-effective-period error processing section 20 causes a display unit (not shown) connected to the personal computer 6 to indicate that the content can not be purchased because of exceeding the effective period of the content selected by the user 5 or the effective period of the CD-ROM.

The content key fetching section 19 decrypts the received purchase number with the machine ID and fetches the content key. This content key is inputted to the content decryption element 9 and is, as explained herein above, used for decrypting the content read from the CD-ROM 11.

<Purchasing Procedure>

Given next is an explanation of processes executed within the personal computer 6 and the SD center 1 to purchase the content.

Figure 3:
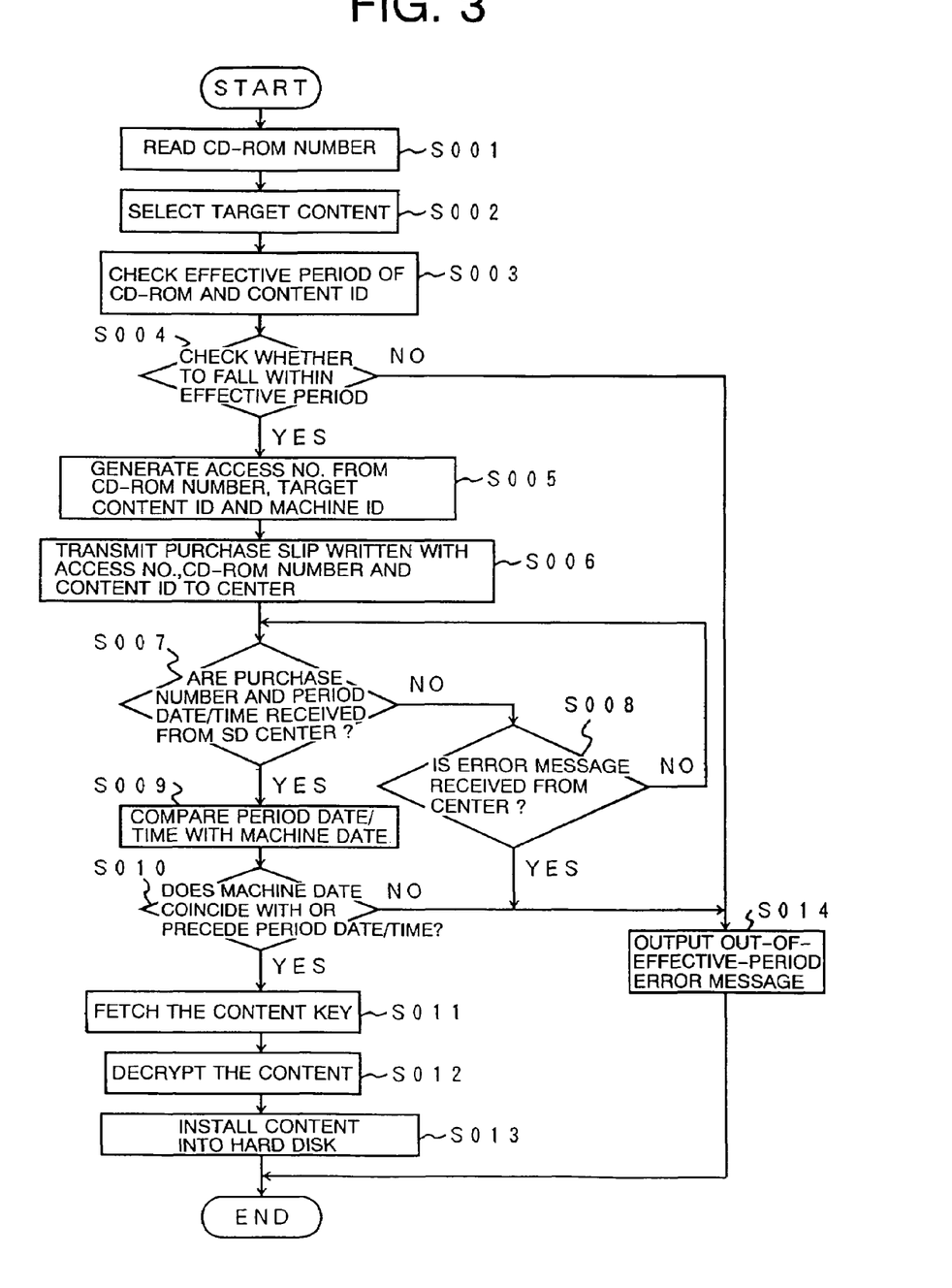
FIG. 3 is a flowchart showing control processes executed by the personal computer.

FIG. 3 shows a control processing program executed by the navigator 10 and the content decryption element 9 within the personal computer 6.

The processing in FIG. 3 is started in response to an operation by the user 5. Then, in first step S001, the CD-ROM number written on the CD-ROM 11 loaded in the personal computer 6 is read. In next step S002, menus such as a purchase accept menu that are stored in the CD-ROM 11 are displayed, and there is a wait till the user 5 chooses one of the contents to purchase.

In next step S003, the effective period of the CD-ROM 11 and the effective period of the content selected in step S002 are checked. Subsequently, if the present machine date exceeds the effective period of the CD-ROM 11 or the effective period of the content selected in step S002 (step S004), the processing proceeds to step S014.

Contrastingly, if the present machine date falls within the effective period of the CD-ROM 11 and within the effective period of the content selected in step S002 (step S004), the predetermined arithmetic operations is performed to the CD-ROM number read in step S001, the content ID of the content selected in step S002 and the machine ID 50 to generate an access number in step S005.

In step S006, the access number generated in step S005, the CD-ROM number read in step S001 and the content ID of the content selected in step S002, are written onto the purchase slip in the text format and then transmitted to the SD center 1.

Figure 4:
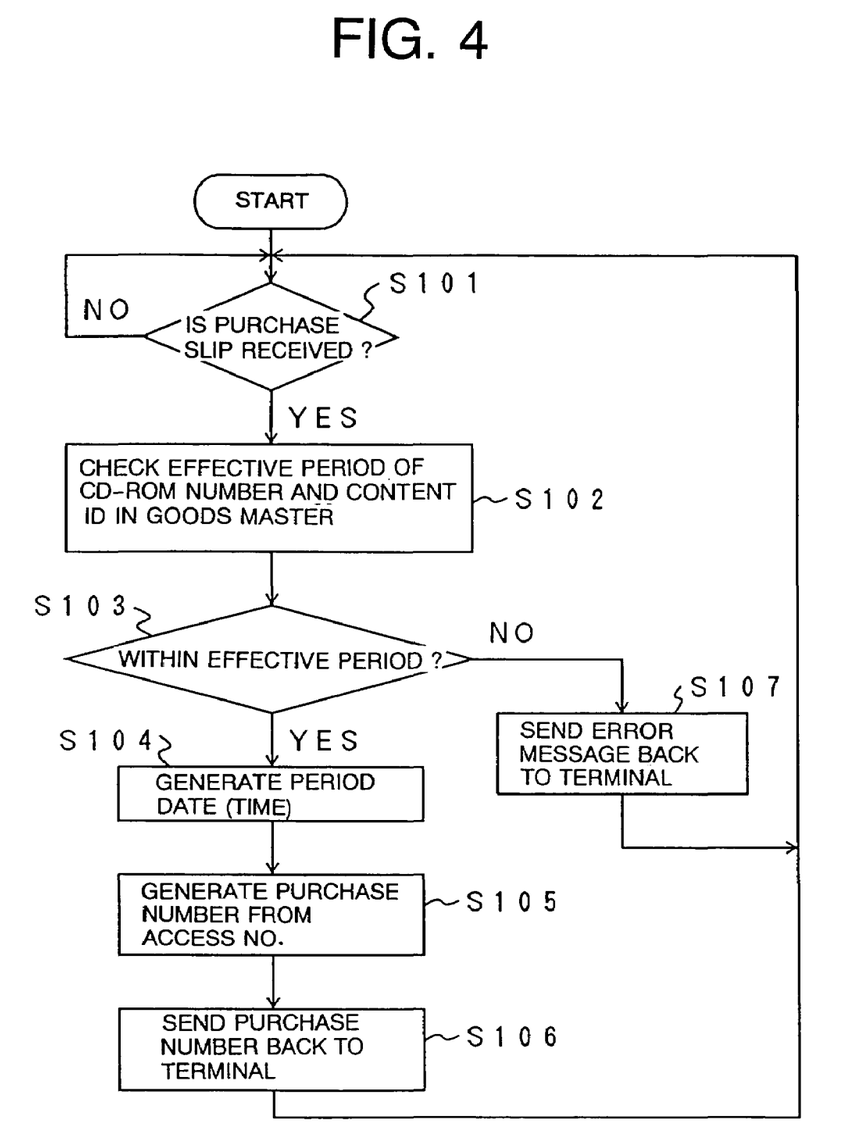
FIG. 4 is a flowchart showing control processes executed by the SD center.

Whether this purchase slip is received by the SD center 1 is checked in step S101 in the control processing program, in FIG. 4, executed by the SD center 1.

The SD center 1, upon receiving the purchase slip, refers to the goods master 32 in step S102. Subsequently, the SD center 1 reads from the goods master 32 the CD-ROM effective period corresponding to the CD-ROM number that is written on the purchase slip and the content effective period corresponding to the content ID that is written onto the purchase slip. Then, the SD center 1 checks the thus read CD-ROM effective period and content effective period.

If the present date exceeds the effective period of the CD-ROM 11 or the effective period of the content selected in step S002 (step S103), the error message is sent back to the personal computer 6 as a party originally sending the purchase slip in step S107, and the processing returns to step S101 to wait for receiving a next purchase slip.

In contrast with this, if the present date falls both within the effective period of the CD-ROM 11 and within the effective period of the content selected in step S002 (step S103), the "period date and time" is generated in step S104.

In next step S105, the purchase number is generated based on the access number written onto the purchase slip received in step S101.

In next step S106, the "period date and time" generated in step S104 is paired with the purchased number generated in step S105, and the combination thereof is sent back to the personal computer as the party originally sending the purchase slip. Then, the processing returns to step S101 to wait for receiving a next purchase slip.

Whether the combination of the purchase slip and the "period date and time" are received by the personal computer 6 as the party originally sending the purchase slip is checked in step S007 in FIG. 3. Then, if the combination of the purchase slip and the "period date and time" are not received, whether the error message transmitted from the SD center 1 is received by the personal computer 6 is checked in step S008. If the error message is received, the processing proceeds to step S014. Whereas if error message is not received, the processing returns to step S007.

On the contrary, it is determined that the combination of the purchase slip and the "period date and time" are received in step S007, the "period date and time" is compared with the machine date in step S009. Then, if the "period date and time" are before the machine date (step S010), the processing goes forward to step S014.

If the "period date and time" is posterior to the machine date (step S010), in step S011, the content key is fetched out of the purchase number received in step S007.

In next step S012, the content selected in step S002 is decrypted with the content key fetched in step S011.

In next step S013, the content decrypted in step S012 is installed into the hard disk 12.

On the other hand, in step S014, an error message indicating that the content can be neither decrypted nor installed because of exceeding the effective period of the loaded CD-ROM itself or the effective period of the selected content is displayed on the display unit (not shown) connected to the relevant personal computer 6.

As discussed above, according to the present embodiment, the personal computer 6 is capable of checking the effective periods of the CD-ROM and of the content and rejecting the transmission of the purchase slip in case one of the effective periods is elapsed. Further, in case the purchase slip illegally created by changing the machine date of the personal computer 6 is transmitted to the SD center 1, the SD center 1 is capable of checking by comparing the present date with the effective period recorded on the goods master 32 and rejecting the transmission of the key (which is the purchase number) with respect to the content or the CD-ROM of which effective periods are elapsed. It is to be noted that the SD center 1 may terminate the sales period of the content with a stagnation in sales and the sales period of content just before its version-up because of capable of changing (reducing) effective period recorded on the goods master 32 irrespective of the effective period written to the CD-ROM 11.

Further, the SD center 1 may affixes the "period date and time" prescribed separately from the CD-ROM effective period or the content effective period to the key (which is the purchase number) when sending the key back to the personal computer 6 as the party originally sending the purchase slip. The personal computer 6 checks this "period date and time" and is allowed to decrypt and install only when the machine date is anterior to the "period date and time". Accordingly, even if a purchase slip sending time is in close proximity to the CD-ROM effective period or the content effective period, a "period date" with an allowance for an operation can be set in the personal computer. Hence, the content can be decrypted and installed during a period up to the "period date".

As discussed above, according to the content sales period verifying system or the content decryption key effective period verifying system of the present invention, the content sales period can be set in the content distribution system for selling the content on line.

A wide range of different working modes can be formed based on the present invention without deviating from the spirit and scope of the present invention. The present invention, therefore, is not restricted by its specific working modes except being limited by the appended charges.

The present invention is not limited to the embodiments, described above, but also encompasses variations thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be restored to, falling within the scope of the invention.

The invention claimed is:

1. A terminal, operating in conjunction with a center, the center having a database registered with a sales period set on each content, a database sales period reading section, a present time-sales period determining section and a key supplying section, comprising:
   a period reader reading a requestable calendar sales period of time stored on an individual self contained computer readable content medium, the content medium indicating the requestable calendar sales period of time during which a content on the content medium can be served and sold;
   a present calendar time data generator generating present calendar time data indicating
   a present calendar time;
   a comparator comparing the requestable calendar sales period of time with the present calendar time; and
   a requestor for submitting a request when said comparator judges that the present calendar time falls within the requestable calendar sales period of time, to the center for obtaining use of the content.

2. A terminal according to claim 1, further comprising: a single medium, forming the content medium, storing a plurality of locked contents, each locked content provided with a locked content requestable calendar sales period thereof; and
   a key receiver for receiving a key for unlocking the locked content.

3. A terminal according to claim 2, wherein said terminal further comprises:
   a disk for storing the contents; and
   an installer installing a loader for the content.

4. A terminal according to claim 1, wherein said server submits a request to the center when the present calendar time falls within the requestable calendar sales period of time.

5. A terminal according to claim 1, wherein said terminal further comprises a second comparator comparing an requestable calendar sales period of time with the present calendar time and determining whether the present calendar time is within the requestable calendar sales period of time.

6. A sales system comprising:
   a terminal, operating in conjunction with a center, the center having a database registered with a sales period set on each content, a database sales period reading section, a present time-sales period determining section and a key supplying section, the terminal comprising:

a period reader reading a requestable calendar sales period of time stored on a self contained independent computer readable content medium indicating the requestable calendar sales period of time during which a content can be served and sold by submitting a request to a center;

a present calendar time generator for generating present calendar time data indicating a present calendar time;

a comparator comparing the requestable calendar sales period of time with the present calendar time; and a requestor submitting a request to the center for obtaining use of the content when said comparator judges that the present calendar time falls within the requestable calendar sales period of time; and the center comprising:

a key supplier supplying said terminal with a key for unlocking the content when the present calendar time falls within the requestable calendar sales period of time.

7. A sales system according to claim 6, wherein said center further comprises a database registered with the requestable calendar sales period of time of the content.

8. A sales system according to claim 6, further comprising:

a period data changer changing period data indicating a serving period of the contents; and wherein said terminal further comprising:

a second comparator comparing the requestable calendar sales period of time with the serving period and determining whether the serving period lies within the requestable calendar sales period of time.

9. A self contained computer readable storage medium which contains locked content, a requestable calendar sales period concerning the locked content, and a program executed by a computer, wherein the program operates in conjunction with a center, the center having a database registered with a sales period set on each content, a database sales period reading section, a present time-sales period determining section and a key supplying section, wherein said program:

reads the requestable calendar sales period of time;

generates present calendar time data indicating a present calendar time;

compares the requestable calendar sales period of time with the present calendar time;

judges that the present calendar time data falls within said requestable calendar sales period or falls outside the requestable calendar sales period of time; and requests to the center for obtaining use of the locked content when the present calendar time falls within said requestable calendar sales period of time; and uses a key to unlock, serve and sell the locked content stored thereon when the present calendar time falls within said requestable calendar sales period of time.

10. A storage device according to claim 9, wherein the requestable calendar sales period of time is written as single terminal data indicating starting or ending calendar sales time interval.

11. A self contained computer readable storage medium including both locked content and a requestable calendar sales period of time concerning the locked content, the storage device is accessed by a computer, wherein the computer operates in conjunction with a center, the center having a database registered with a sales period set on each content, a database sales period reading section, a present time-sales period determining section and a key supplying section, wherein said computer:

reads the requestable calendar sales period of time;

generates present calendar time data indicating a present calendar time;

compares the requestable calendar sales period of time with the present calendar time;

judges that the present calendar time data falls within the requestable calendar sales period of time or falls outside of said requestable calendar sales period of time;

requests a key from the center; and uses the key to unlock the locked content stored thereon when the present calendar time falls within said requestable calendar sales period of time to allow access to, serve and sell the locked content if the judging determines the present calendar time data falls within said requestable calendar sales period of time.

12. A self-contained computer-readable medium encoded with a computer program, which operates in conjunction with a center, the center having a database registered with a sales period set on each content, a database sales period reading section, a present time-sales period determining section and a key supplying section, and which performs the following functions:

reads a requestable calendar sales period of time, stored on the computer-readable medium, indicating a calendar period of time during which a locked content on the medium can be served and sold;

generates present calendar time data indicating a present calendar time;

compares the requestable calendar sales period of time with the present calendar time;

judges that the present calendar time falls within the requestable calendar sales period of time or falls outside of said requestable calendar sales period of time; and sends a requestor to request a key for the locked content if the judging determines the present calendar time data falls within said requestable calendar sales period of time, to the center for obtaining use of the locked content.

13. A terminal, operating in conjunction with a center, the center having a database registered with a sales period set on each content, a database sales period reading section, a present time-sales period determining section and a key supplying section, the terminal comprising:

a reading device which reads a requestable calendar sales period of time, stored on a self contained computer readable content medium indicating the requestable calendar sales period of time during which a locked content stored on the content medium can be served and sold;

a clock for indicating a present calendar time;

a comparator which determines if the present calendar time falls within the requestable calendar sales period of time; and a requestor for submitting a request for a key for the locked content on the content medium when the comparator determines that the present calendar time falls within the requestable calendar sales period of time, to the center for obtaining use of the locked content.

14. A method for ascertaining a sales period exists using a self contained independent computer readable medium operating in conjunction with a center, the center having a database registered with a sales period set on each content, a database sales period reading section, a present time-sales period determining section and a key supplying section, said method comprising:

reading a requestable calendar sales period of time stored on the self contained independent computer readable medium indicating a serving calendar period of time;

generating present calendar time data indicating a present calendar time;

comparing the requestable calendar sales period of time stored on the medium with the present calendar time to judge whether said present calendar time falls within the requestable calendar sales period of time; and requesting a key from the center to serve and sell the locked content when the comparing determines that the present calendar time falls within the requestable calendar sales period of time.

15. A storage device readable by a computer operating in conjunction with a center, the center having a database registered with a sales period set on each content, a database sales period reading section, a present time-sales period determining section and a key supplying section, comprising:

a storer storing a locked content on a self contained independent computer readable storage medium, the medium including a requestable calendar sales period of time concerning the locked content and a program executed by the computer, wherein said program:

reads the requestable calendar sales period of time;

generates present calendar time data indicating a present calendar time;

compares the requestable calendar sales period of time with the present calendar time;

accessing said program; and using a requestor for submitting a request for a key when the requestable calendar sales period of time is compared with the present calendar time and the present calendar time falls within said requestable calendar sales period of time, the request made to the center for serving and selling use of the locked content.

16. A self contained independent computer readable storage medium operating in conjunction with a center, the center having a database registered with a sales period set on each content, a database sales period reading section, a present time-sales period determining section and a key supplying section, comprising:

a locked content stored on the medium assessable by a user via a computer;

a requestable calendar sales period of time data stored with the locked content on the medium indicating a requestable calendar sales period of time during which the locked content can be accessed by the user;

a program which causes the computer to refuse access to the locked content by the user if a present calendar date falls outside of the requestable calendar sales period of time indicated by the requestable calendar sales period of time data; and a requesting unit for submitting a request for a key when said program does not cause the computer to refuse access to the locked content, the request submitted to the center for serving and selling use of the locked content.

17. A computer-readable storage medium encoded with a computer program which performs the following operations, the computer program operating in conjunction with a center, the center having a database registered with a sales period set on each content, a database sales period reading section, a present time-sales period determining section and a key supplying section:

reads a requestable calendar sales period of time, stored on a disk, indicating the requestable calendar sales period of time during which a locked content on the disk can be served and sold;

generates present calendar time data indicating a present calendar time;

compares the requestable calendar sales period of time with the present calendar time; and transforms a result of said comparison to data reflecting that a user is allowed to utilize the locked content, when the present calendar time falls within the requestable calendar sales period of time; and requests the center for a key to obtain use of the locked content when said comparing step determines that said present calendar time falls within said requestable calendar sales period of time.

18. A method for ascertaining a sales period exists using a self contained computer readable storage medium operating in conjunction with a center, the center having a database registered with a sales period set on each content, a database sales period reading section, a present time-sales period determining section and a key supplying section, said method comprising:

reading a requestable calendar sales period of time stored on a self contained computer readable storage medium indicating a requestable calendar sales period of time;

generating present calendar time data indicating a present calendar time;

comparing the requestable calendar sales period of time stored on the medium with the present calendar time to judge whether said present calendar time falls within the requestable calendar sales period of time; and requesting the center for a key to serve and sell use of a locked content stored on the medium storing the requestable calendar sales period of time to a storage medium when said comparing determines that said present calendar time falls within said requestable calendar sales period of time.

19. A terminal, operating in conjunction with a center, the center having a database registered with a sales period set on each content, a database sales period reading section, a present time-sales period determining section and a key supplying section, the terminal comprising:

a period reader reading a requestable calendar sales period of time stored on a self contained independent content medium indicating the requestable calendar sales period of time during which a locked content stored directly on the content medium released to end users can be served and sold;

a present calendar time data generator generating present calendar time data indicating a present calendar time;

a comparator comparing the requestable calendar sales period of time with the present calendar time; and a requestor for submitting a request to the center for a key to access the locked content when said comparator judges that the present calendar time falls within the requestable calendar sales period of time.

20. A terminal, operating in conjunction with a center, the center having a database registered with a sales period set on each content, a database sales period reading section, a present time-sales period determining section and a key supplying section, the terminal comprising:

a period reader reading a requestable calendar sales period of time stored on a self contained independent content medium indicating the requestable calendar sales period of time during which a locked content stored directly on the content medium can be served and sold;

a present calendar time data generator generating present calendar time data indicating a present calendar time;

a comparator comparing the requestable calendar sales period of time with the present calendar time; and a requesting unit requesting a key for a service of the locked content when said comparator judges that the present calendar time falls within the requestable calendar sales period of time.

21. An independent self contained computer readable storage medium released to end users which contains locked content, a requestable calendar sales period of time concerning the locked content, and a program executed by a computer, the program operating in conjunction with a center, the center having a database registered with a sales period set on each content, a database sales period reading section, a present time-sales period determining section and a key supplying section, wherein said program:

reads the requestable calendar sales period directly from the storage medium;

generates present calendar time data indicating a present calendar time;

compares the requestable calendar sales period of time with the present calendar time;

judges that the present calendar time data falls within said requestable calendar sales period of time or falls outside the requestable calendar sales period of time; and requests a key from the center to serve and sell use of the locked content if the judging judges that the present calendar time falls within said requestable calendar sales period of time.

22. A self contained computer readable storage medium readable by a computer, the self contained computer readable storage medium operating in conjunction with a center, the center having a database registered with a sales period set on each content, a database sales period reading section, a present time-sales period determining section and a key supplying section, the self contained computer readable storage medium comprising:

a storer storing a locked content on the medium including a requestable calendar sales period of time concerning the locked content and a program executed by the computer, wherein said program:

reads the requestable calendar sales period of time;

generates present calendar time data indicating a present calendar time; and compares the requestable calendar sales period of time with the present calendar time;

accesses said program; and requests a key from the center for service and selling of the locked content when the requestable calendar sales period of time is compared with the present calendar time and it is determined that the present calendar time falls within said requestable calendar sales period of time.

23. A computer-readable storage medium encoded with a computer program, the computer program operating in conjunction with a center, the center having a database registered with a sales period set on each content, a database sales period reading section, a present time-sales period determining section and a key supplying section, wherein the computer program performs the following operations:

reads a requestable calendar sales period of time, stored on a disk, indicating the requestable calendar sales period of time during which a locked content on the disk can be served and sold;

generates present calendar time data indicating a present calendar time;

compares the requestable calendar sales period of time with the present calendar time; and transforms a result of said comparison to data reflecting that a user is allowed to utilize the locked content, when the present calendar time falls within the requestable calendar sales period of time; and requests a key from the center to unlock the locked content when said comparing step determines that said present calendar time falls within said requestable calendar sales period of time.

24. A method for ascertaining whether a sales period exists, using a self contained computer readable storage medium operating in conjunction with a center, the center having a database registered with a sales period set on each content, a database sales period reading section, a present time-sales period determining section and a key supplying section, said method comprising:

reading a requestable calendar sales period of time stored on a self contained computer readable storage medium indicating the requestable calendar sales period of time during which the computer readable storage medium can be served and sold;

generating present calendar time data indicating a present calendar time;

comparing the requestable calendar sales period of time stored on the storage medium with the present calendar time to judge whether said present calendar time falls within the requestable calendar sales period of time; and requesting a key from the center for retrieval of a locked content stored on the storage medium when said comparing determines that said present calendar time falls within said requestable calendar sales period of time.

* * * * *

UNITED STATES PATENT AND TRADEMARK OFFICE
CERTIFICATE OF CORRECTION

PATENT NO. : 7,016,878 B2 Page 1 of 1
APPLICATION NO. : 08/645073
DATED : March 21, 2006
INVENTOR(S) : Makoto Yoshioka et al.

It is certified that error appears in the above-identified patent and that said Letters Patent is hereby corrected as shown below:

Col. 12, Line 58, after "comparing" delete "an" and insert --a-- therefor.
Col. 14, Line 19, delete "self-contained computer-readable" and insert --self contained computer readable-- therefor.
Col. 14, Line 28, delete "compter-readable" and insert --computer-readable-- therefor.
Col. 15, Line 47, delete "assessable" and insert --accessible-- therefor.
Col. 15, Line 64, delete "compter-readable" and insert --computer-readable-- therefor.
Col. 18, Line 5, delete "compter-readable" and insert --computer-readable-- therefor.

Signed and Sealed this

Seventeenth Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 7,016,878 B2 Page 1 of 1
APPLICATION NO. : 08/645073
DATED : March 21, 2006
INVENTOR(S) : Makoto Yoshioka et al.

It is certified that error appears in the above-identified patent and that said Letters Patent is hereby corrected as shown below:

Column 12, line 34, Claim 1, replace "calendar time data indicating a present calendar time" with --calendar time data indicating a present calendar time-- (all one line)

Column 16, line 54, Claim 19, replace "calendar time data indicating a present calendar time" with --calendar time data indicating a present calendar time-- (all one line)

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,016,878 B2 |
| APPLICATION NO. | : 08/645073 |
| DATED | : March 21, 2006 |
| INVENTOR(S) | : Makoto Yoshioka et al. |

It is certified that error appears in the above-identified patent and that said Letters Patent is hereby corrected as shown below:

Column 12, lines 34-55, Claim 1, replace "calendar time data indicating a present calendar time" with --calendar time data indicating a present calendar time-- (all one line).

Column 16, lines 54-55, Claim 19, replace "calendar time data indicating a present calendar time" with --calendar time data indicating a present calendar time-- (all one line).

Signed and Sealed this

Third Day of July, 2007

JON W. DUDAS
*Director of the United States Patent and Trademark Office*